United States Patent [19]

Yoshida

[11] Patent Number: 4,814,894
[45] Date of Patent: Mar. 21, 1989

[54] IMAGE TRANSMITTING SYSTEM HAVING DENSITY SELECTION

[75] Inventor: Takehiro Yoshida, Tokyo, Japan

[73] Assignee: Canon Kabushiki Kaisha, Tokyo, Japan

[21] Appl. No.: 720,608

[22] Filed: Apr. 8, 1985

[30] Foreign Application Priority Data

Apr. 16, 1984 [JP] Japan .................................. 59-75123

[51] Int. Cl.⁴ ............................................ H04N 1/387
[52] U.S. Cl. ..................................... 358/298; 358/287
[58] Field of Search ....................... 358/298, 287, 293; 355/14 SH, 14 C

[56] References Cited

U.S. PATENT DOCUMENTS 4,456,372  6/1984  Yamauchi ........................ 355/14 SH
4,568,973  2/1986  Ishida .............................. 358/287 X Primary Examiner—Joseph W. Hartary
Attorney, Agent, or Firm—Fitzpatrick, Cella, Harper & Scinto

[57] ABSTRACT

An image transmitting method in an image transmitting apparatus such as a facsimile apparatus having a plurality of transmission modes in which pixel densities differ. This method comprises the steps of: detecting a size of a recording paper on the reception side; detecting a size of an original to be transmitted; automatically selecting the transmission mode of a high pixel density in the case where the size of the transmitting original is larger than the size of the recording paper; transmitting the image of the transmitting original to the reception side; and detecting the receivable mode on the reception side. With this method, even in case of reproducing the image in the reduction size mode on the reception side, the image with a high image quality can be always derived irrespective of the selection of the image quality mode of the operator.

3 Claims, 2 Drawing Sheets

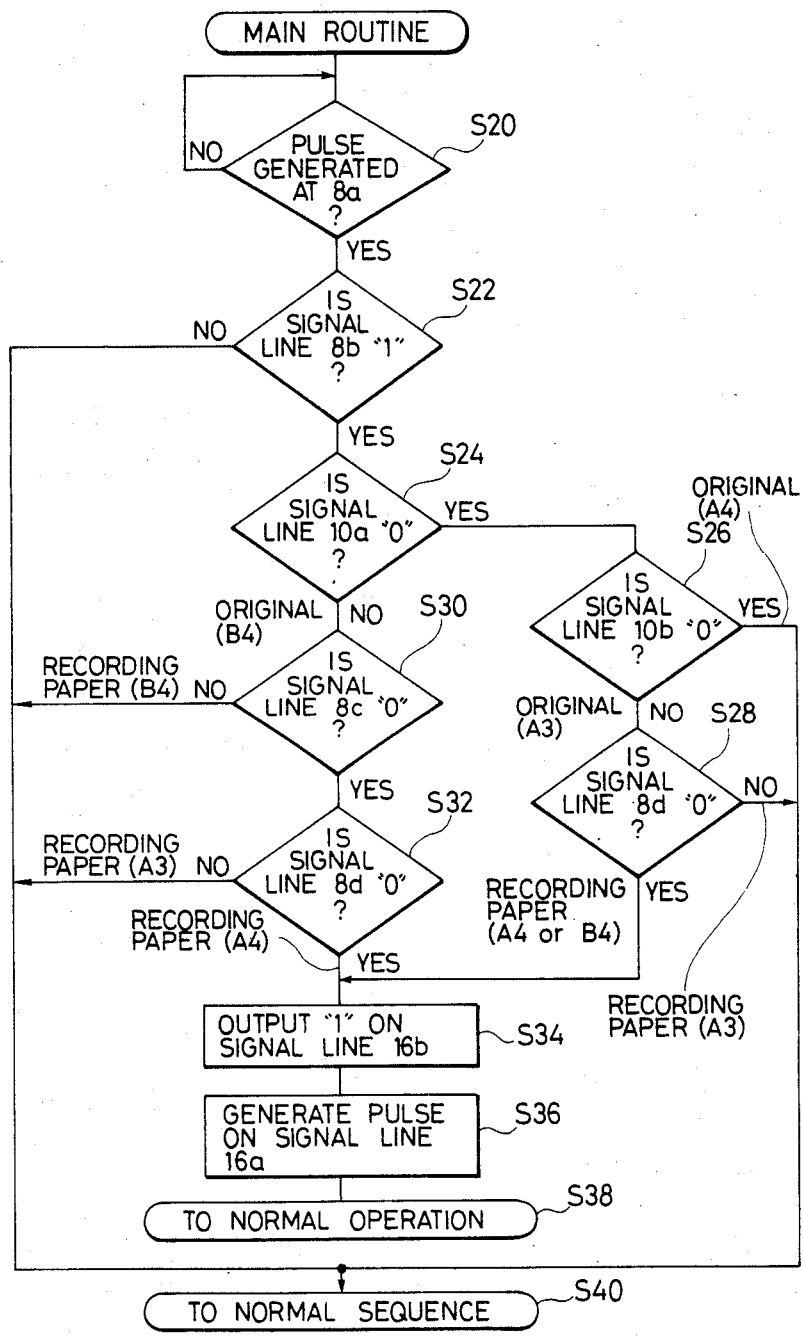

IMAGE TRANSMITTING SYSTEM HAVING DENSITY SELECTION

BACKGROUND OF THE INVENTION

1. Field of the Invention

The present invention relates to an image transmitting method for transmitting an image and, more particularly, to an image transmitting method for transmitting an image in a plurality of image quality modes.

2. Description of the Prior Art

Recently, there are many facsimile apparatuses which are constituted such that communication can be performed in a plurality of image quality modes, including at least a standard mode and a high image quality mode in which an image density is higher than that in the standard mode. In the conventional apparatus, a proper image quality can be selected from those image quality modes in accordance with an original such as a drawing, document or the like.

In general, a mode selection switch is provided on an operation panel or the like and the operator operates this switch to select the image quality mode. Hitherto, when the standard mode has been selected by an apparatus on the image transmission side, the image is transmitted in the standard mode irrespective of the size of the original and the density of the image information. Therefore, in this case, if the size of the recording paper in an apparatus on the reception side is smaller than the original size on the transmission side, the image is reduced upon transmission, so that there is a drawback that an original on which fine characters are written or the like is reproduced in a size which is very difficult to read.

SUMMARY OF THE INVENTION

It is an object of the present invention to provide an image transmitting method in which the foregoing drawback is eliminated.

It is another object of the invention to provide an image transmitting method in which an image of a high image quality can be derived even in the case of reproduction on the reception side on the reduction size mode.

According to the present invention, these objects are obtained by provision of an image transmission system including an apparatus having a plurality of transmission modes, including at least a high pixel density mode and a low pixel density mode, first and second means respectively for detecting size of a recording sheet at a reception side on the basis of a control signal from the latter and the size of an original document, and mode selection means for selecting the transmission mode in accordance with an indication of mode provided by an indication means, which may be operable by an operator. The mode selection means, however, automatically selects the high pixel density transmission mode irrespective of the indication provided by the indication means, when the detected size of the original document is larger than that of the recording sheet. A third detection means may also be provided for detecting when the reception side is able to receive a high pixel density transmission mode.

Other objects and features of the present invention will be more fully appreciated from the following detailed description with reference to the accompanying drawings.

BRIEF DESCRIPTION OF THE DRAWINGS

FIG. 2 is a flowchart for explaining a control procedure in the arrangement of FIG. 1.

DETAILED DESCRIPTION OF THE PREFERRED EMBODIMENT

Figure 1:
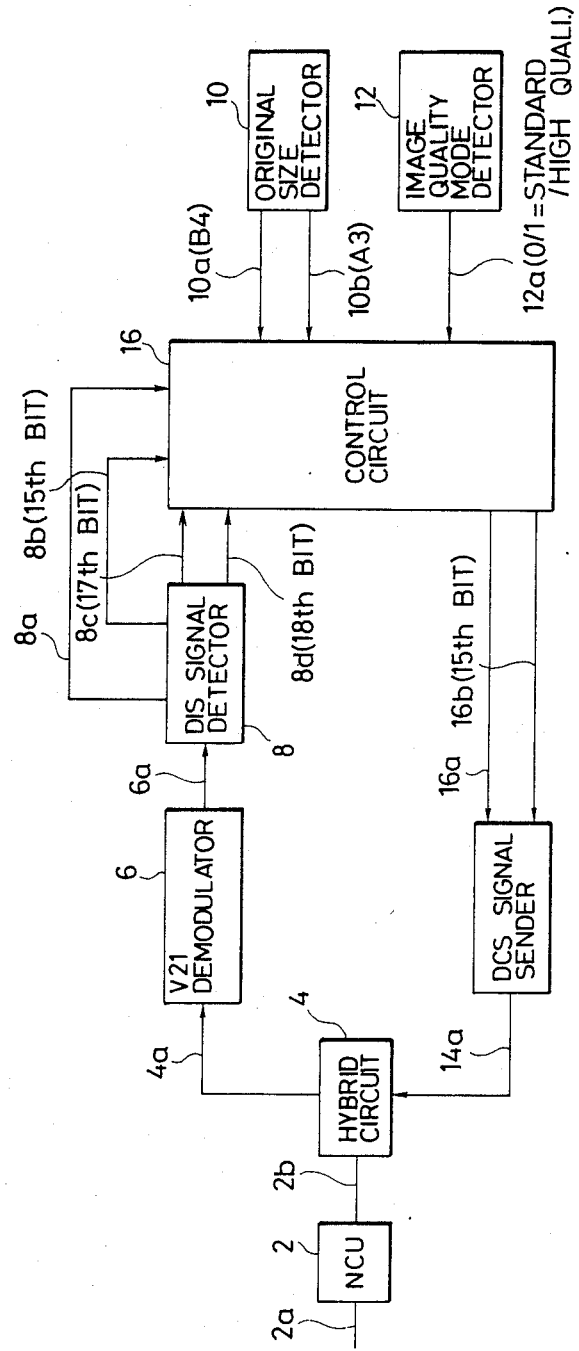
FIG. 1 is a block diagram showing an arrangement of the main part of a facsimile apparatus in which the present invention is employed.

The present invention will now be described in detail hereinbelow with respect to an embodiment shown in the drawing, in which a G3 facsimile apparatus complying with the CCITT Recommendation T4 will be explained hereinbelow as an exemplary embodiment.

FIG. 1 shows an arrangement of the main part of the facsimile apparatus in which the present invention is employed. In FIG. 1, a communication line $2a$ such as a telephone line or the like is connected to an NCU (network control unit) 2. The NCU 2 performs the connection control of a switched network, holding of a loop, switching operation from a communication apparatus such as an ordinary telephone set, etc., to a data transmission path, or the like.

A hybrid circuit 4 is connected through a signal line $2b$ 1to the post or output stage of the NCU 2. The hybrid circuit 4 serves to separate a transmission signal and a reception signal. The reception signal is supplied through a signal line $4a$ to a V21 demodulator 6, while the transmission signal is inputted from a DCS signal sender 14 through a signal line $14a$ to the hybrid circuit 4.

The V21 demodulator 6 is connected to the signal line $4a$, and performs the demodulating operation complying with the CCITT Recommendation V21, and the result of demodulation is inputted through a signal line $6a$ to a DIS signal detector 8.

The DIS signal detector 8 detects a DIS (digital identification) signal transmitted from the image reception side from the demodulated signal. When the DIS signal is detected, the detector 8 generates a pulse onto a signal line $8a$ and at the same time outputs the information of the 15th, 17th and 18th bits in the FIF (facsimile information field) of this DIS signal to a control circuit 16 through signal lines $8a$, $8c$ and $8d$, respectively.

The control circuit 16 consists of a microprocessor and a memory and the like and performs the control for a recording section, image reading section and the like (not shown) and the control for the overall communicating operation. In this invention, an original size detector 10 and an image quality mode detector 12 for the control which will be explained later are connected to the control circuit 16.

The original size detector 10 detects the size of the original in the original reading section (not shown) using a detecting device such as a photointerrupter or the like and communicates the size of the original to the control circuit 16 through signal lines $10a$ and $10b$. When the original installed is the A4 size, which is the standard size based on the G3 standard, "0" and "0" are outputted onto the signal lines $10a$ and $10b$, respectively. In the case of an original of the B4 size, "1" and "0" are outputted onto the signal lines $10a$ and $10b$, respectively. In the case of the original of the A3 size, "0" and "1" are outputted onto the signal lines $10a$ and $10b$, respectively.

The image quality mode detector 12 checks the state of the image quality selection switch provided on the operation panel or the like, thereby detecting the mode selected by the operator. If the standard mode is selected, "0" is outputted and if the high image quality mode is selected, "1" is outputted to the control circuit 16 through a signal line 12a.

The DCS signal sender 14 is shown as the circuit of the transmission system. An arrangement of the transmission system of the image signal may be similar to that of the prior art and is not shown here.

When a pulse is generated onto the signal line 16a from the control circuit 16, the DCS signal sender 14 outputs a DCS (digital command) signal to the hybrid circuit 4 through the signal line 14a. In this case, the value inputted through a signal line 16b from the control circuit 16 has been set into the 15th bit in the FIF of the DCS signal.

Subsequently, the image transmitting operation in the foregoing arrangement will be explained with reference to a flowchart in FIG. 2. FIG. 2 shows a part of the control procedure in the phase B (preparation for transmission) of the control circuit 16. There will be described hereinbelow the case where the size of the recording paper on the reception side is either A3, A4 or B4 and the original size is also one of those sizes.

In the image transmitting operation, the control circuit 16 first waits for the generation of a pulse onto the signal line 8a in step S20 in FIG. 2. That is, a check is made to see if the DIS signal has been transmitted or not from the image reception side.

In the case where the DIS signal is transmitted, a check is made in step S22 to see if the signal line 8b is "1" or not, i.e., if the 15th bit in the FIF of the relevant DIS signal is "1" or not, that is to say, if the apparatus on the distant side can record in the high image quality mode or not. If the distant side does not have the high image quality recording mode, the processing routine advances to step S40 and the image transmission is executed similarly to the prior art.

In the case where the distant side has the high image quality mode, a check is made in step S24 to see if the signal line 10a is "0" or not, i.e., if the size of the original is B4 or not. When the original size is B4, step S30 follows. In other cases than B4, step S26 follows.

In step S26, a check is made to see if the signal line 10b is "0" or not, that is, if the original size is A3 or not. If the answers are all YES in steps S24 and S26, the original size is determined to be A4, so that the processing routine advances to the foregoing step S40. In case of the original of A3 size, step S28 follows.

In step S28, a check is made to see if the signal line 8d is "0" or not, i.e., if the size of the recording paper on the reception size is A3 or not (thus, whether it is A4 or B4). In the case of the recording paper of A3 size, step S40 follows. In the case where the recording paper is A4 or B4, step S34 follows.

On the other hand, a check is made in step S30 to see if the signal line 8c is "0" or not, that is, whether the recording paper on the reception side is B4 or not is detected. In the case of the recording paper of B4 size, step S40 follows. In other cases than B4, step S32 follows.

In step S32, a check is made to see if the signal line 8d, is "0" or not, and thus to see if the recording paper is A3 size or not. In the case of the recording paper of A3 size, step S40 follows. When both answers in steps S30 and S32 are YES, the size of the recording paper is determined to be A4 and then the processing routine advances to step S34 in this case.

Therefore, in the case where the reception side has the high image quality mode, when the original size is B4 and the recording paper size is A4 or when the original size is A3 and the recording paper size is A4 or B4 which is smaller than A3, the processing routine advances to step S34.

In the foregoing case, the image is reduced and reproduced; therefore, the high image quality mode is forcedly selected irrespective of the selection of the operator. Practically speaking, the control circuit 16 outputs "1" onto the signal line 16b in step S34 and sets the information representing that the transmission is performed in the high image quality mode into the FIF of the DCS signal. Thereafter, in step S36, a pulse is generated onto the signal line 16a and the DCS signal is transmitted through the hybrid circuit 4 and NCU 2.

In step S38, the transmission is performed in the high image quality mode in accordance with a procedure similar to the prior art. In this case, the image data is reduced as necessary in keeping with the original size.

On the other hand, when the original size is B4 and the recording paper size is B4 or A3, or when the original size is A4 and the recording paper size is A3, or the like, that is, in the case where there is no need to reduce the image since the size of the recording paper is larger than the original size, the processing routine advances to step S40. Thus, the communication is carried out in the image quality mode according to the selection of the operator which was detected by the image quality mode detector 12. However, since the reception side has merely the standard mode in the case where the processing routine is jumped from step S22, even if the operator selects the high image quality mode, the standard mode would be selected; this situation is similar to the prior art.

As described above, the high image quality mode having a high pixel density is forcedly selected only in the case where the image is reduced and transmitted. Consequently, even if the communication is performed while the standard mode was selected by the operator on the transmission side, the original image with a suitable resolution and image quality can be reproduced on the reception side. The present invention is effective particularly in the case where there is a large difference in size between the original and the recording paper. The above-described arrangement can be implemented due to slight changes in software and hardware and it is remarkably simple and cheap.

Although the case where there are two kinds of image quality modes has been described in the above, the fundamental concept of the control is also the same if there are a greater number of image quality modes. In addition, the embodiment regarding the G3 facsimile apparatus has been shown in the above, but the invention can be obviously similarly implemented even in other communication modes such as the G2 mode, G4 mode, etc.

As will be apparent from the above description, according to the present invention, there is adopted such an arrangement that: the size of the recording paper on the reception side is detected; the size of the original installed is detected; and the image is forcedly transmitted in the high image quality mode in the case where it is determined that the original size is larger than the recording paper size due to the above-mentioned detections of the sizes of the recording paper and of the original. Therefore, it is possible to simply and cheaply provide an exceelent image transmitting method which can always reproduce the image with a proper resolution and a good image quality on the reception side irrespective of the selection of the image quality mode of the operator.

The present invention is not limited to the foregoing embodiment but many modifications and variations are possible within the spirit and scope of the appended claims of the invention.

What is claimed is:

1. An image transmission apparatus having a plurality of transmission modes, a pixel density of each mode differing from that of others of the modes, and the modes including a high pixel density mode and a low pixel density mode, said apparatus comprising:

indication means for manually indicating one of the transmission modes;

first detection means for detecting a size of a recording sheet at a reception side on the basis of a control signal from the reception side;

second detection means for detecting a size of an original document;

mode selection means for selecting the transmission mode in accordance with the indication of said indication means, except that said mode selection mode selects a transmission mode of high pixel density irrespective of the indication of said indication means when the document is larger than the size of the recording sheet;

transmission means for transmitting an image signal representing an image of the original document in the transmission mode selected by said mode selection means; and third detection means for detecting a mode on the reception side in which the reception side is able to receive, in response to a control signal from the reception side, wherein said mode selection means selects the transmission mode of high pixel density responsive to said third detection means detecting that the reception side can receive a transmission in the transmission mode of high pixel density and the size of the original document is larger than that of the recording sheet.

2. An image transmitting method in a transmitting appartus having a plurality of transmission modes in which pixel densities differ, comprising the steps of:

detecting a size of a recording paper on the reception side;

detecting a size of an original to be tranmitted;

detecting the receivable mode on said reception side;

automatically selecting the transmission mode of a high pixel density in the case where the size of said transmitting original is larger than the size of said recording paper; and transmitting an image of said transmitting original to the reception side, wherein, in said selecting step, the transmission mode of a high pixel density is automatically selected in cases in which the reception side can receive the transmission mode of a high pixel density and also where the size of the transmitting original is larger than the size of the recording paper.

3. An image transmitting method in a transmitting apparatus having a plurality of transmission modes, a pixel density of each mode differing from that of others of the modes, and the modes including a high pixel density mode and a low pixel density mode, said method comprising the steps of:

indicating one of the transmission modes;

detecting a size of a recording sheet on the reception side on the basis of a control signal from the reception side;

detecting a size of an original document;

detecting a mode on the reception side in which the reception side is able to receive, in response to a control signal from the reception side;

selecting the transmission mode in accordance with the mode indication, except that a transmission mode of high pixel density is selected irrespective of the mode indication when the document is larger than the size of the recording sheet; and transmitting an image signal representing an image of the original document in the selected transmission mode, wherein the image signal is transmitted when the size of the orginal document is larger than that of the recording sheet, wherein, in said selecting step, the transmission mode of high pixel density is selected responsive to detection that the reception side can receive a transmission in the transmission mode of high pixel density and the size of the original document is larger than that of the recording sheet.

* * * * *

UNITED STATES PATENT AND TRADEMARK OFFICE
CERTIFICATE OF CORRECTION

PATENT NO.  : 4,814,894
DATED       : March 21, 1989
INVENTOR(S) : TAKEHIRO YOSHIDA It is certified that error appears in the above-identified patent and that said Letters Patent is hereby corrected as shown below:

COLUMN 1

Line 44, "on the" (second occurrence) should read --in a--.

COLUMN 2

Line 26, "1to" should read --to--.

COLUMN 3

Line 4, "outputed" should read --outputted--.

COLUMN 4

Line 68, "exceelent" should read --excellent--.

COLUMN 5

Line 25, "mode" (first occurrence) should read --means--.
    Line 46, "appartus" should read --apparatus--.

UNITED STATES PATENT AND TRADEMARK OFFICE
CERTIFICATE OF CORRECTION

PATENT NO. : 4,814,894

DATED : March 21, 1989

INVENTOR(S) : TAKEHIRO YOSHIDA

Page 2 of 2

It is certified that error appears in the above-identified patent and that said Letters Patent is hereby corrected as shown below:

COLUMN 6

Line 3, "tranmitted;" should read --transmitted;--.

Signed and Sealed this

Sixteenth Day of January, 1990

*Attest:*

JEFFREY M. SAMUELS

*Attesting Officer*   *Acting Commissioner of Patents and Trademarks*